G. A. JOHNSON.
HAND TRAP FOR THROWING CLAY PIGEONS.
APPLICATION FILED MAR. 31, 1919.
1,306,381.
Patented June 10, 1919.
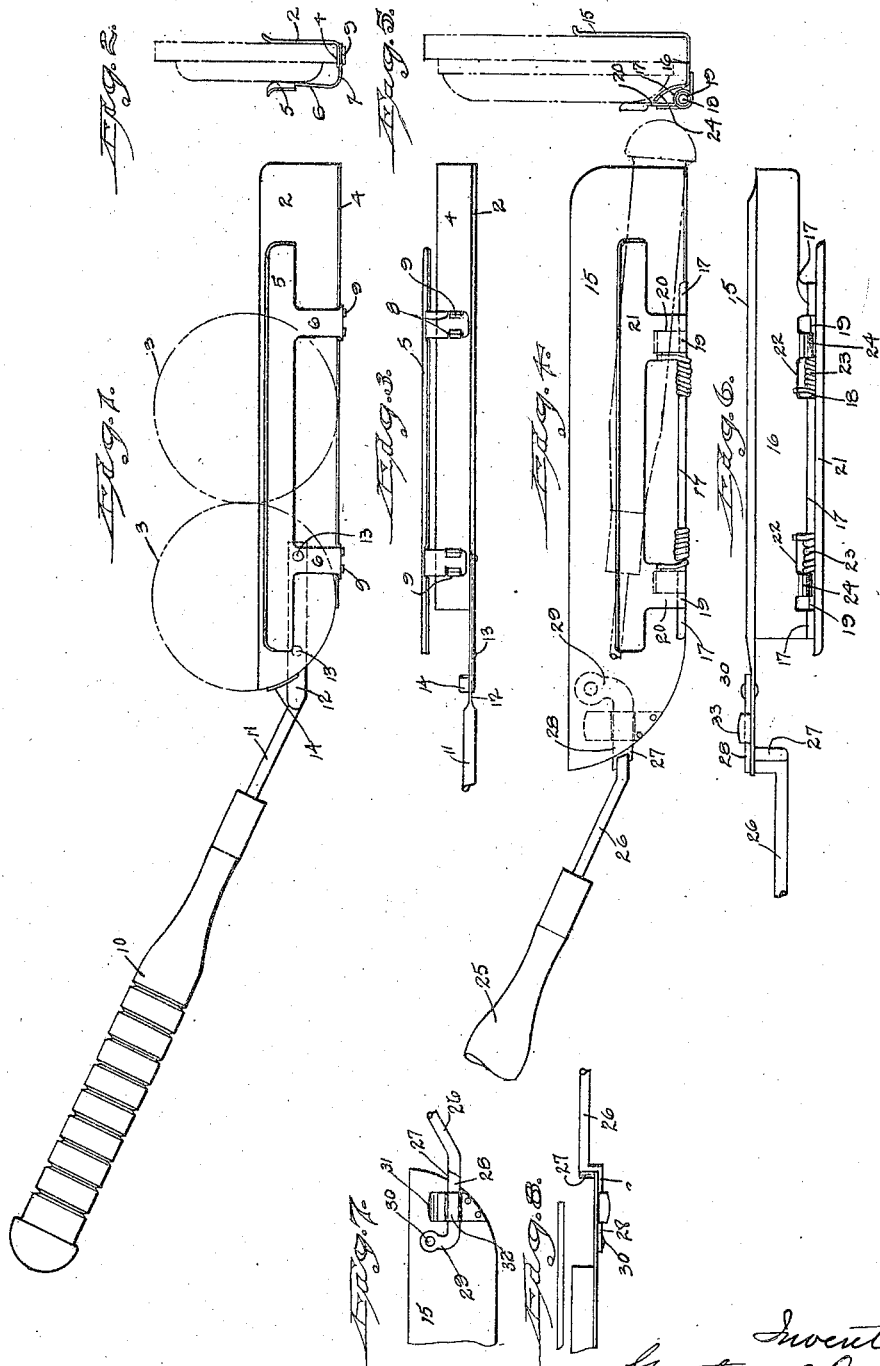

ABSOLUTE# UNITED STATES PATENT OFFICE.

GUSTAVE A. JOHNSON, OF NEW HAVEN, CONNECTICUT, ASSIGNOR TO WINCHESTER REPEATING ARMS CO., OF NEW HAVEN, CONNECTICUT, A CORPORATION.

HAND-TRAP FOR THROWING CLAY PIGEONS.

1,306,381.   Specification of Letters Patent.   Patented June 10, 1919.

Application filed March 31, 1919. Serial No. 286,347.

*To all whom it may concern:*

Be it known that I, GUSTAVE A. JOHNSON, a citizen of the United States, residing at New Haven, in the county of New Haven and State of Connecticut, have invented a new and useful Improvement in Hand-Traps for Throwing Clay Pigeons; and I do hereby declare the following, when taken in connection with the accompanying drawings and the characters of reference marked thereon, to be a full, clear, and exact description of the same, and which said drawings constitute part of this application, and represent, in—

Figure 1 a plan view of a hand trap constructed in accordance with my invention, showing two clay pigeons positioned therein preparatory to being thrown.

Fig. 2 an end view thereof.

Fig. 3 an outside view of the trap with the handle broken away.

Fig. 4 a plan view of one of the modified forms which my improved trap may assume, the handle being shown as broken away in full lines, and in its closed position by broken lines.

Fig. 5 an end view thereof showing a clay pigeon positioned therein preparatory to being thrown.

Fig. 6 an inverted outside view of the trap with the handle broken away.

Fig. 7 a broken reverse plan view of the trap, showing a modified construction of the handle fastening.

Fig. 8 a broken inside view thereof.

My invention relates to an improvement in hand traps for throwing clay pigeons, the object being to provide a simple, cheap, compact, light, durable and efficient trap constructed to throw one or more pigeons.

With these ends in view, my invention consists in a hand trap having certain details of construction as will be hereinafter described and pointed out in the claims.

In carrying out my invention as shown in Figs. 1 to 3 inclusive, I employ a combined trough-shaped carrier and guide of sufficient length to hold and deliver two standard clay pigeons, the said carrier being narrower than half the diameter of a clay pigeon, and open at its outer end. The carrier comprises a bottom plate 2 upon which the pigeons 3 rest, as shown by broken lines in Fig. 1. The outer or rear edge of the said plate is upturned at a right angle to form the outside wall 4 of the carrier, the peripheral edges of the pigeons normally resting upon the inner face of this wall and rolling upon the same as they leave the trap when the same is discharged. The carrier also comprises a top plate 5 located above and substantially parallel with the bottom plate 2 with which it has spring connection so that it will yield to permit the edgewise insertion of the pigeons into the trough and then frictionally grip them with sufficient force to prevent them from accidentally falling out, the width of the trough being less than the thickness of a pigeon. For the purpose of securing the plate 5 to the outside wall 4, the former is made with yielding parallel arms 6 the ends of which are bent at a right angle as at 7 and notched as at 8 for insertion between pairs of fastening fingers 9 struck outward from the wall 4 as clearly shown in Fig. 3. The device is provided with a handle 10 arranged at an obtuse angle with respect to the axis of the carrier and having a shank 11 formed with a flattened end 12 inclined thereto and fastened by rivets 13 to the lower face of the bottom plate 2 as shown in Fig. 3. The inner end of the plate 2 is formed with an upwardly turned integral abutment flange 14 which forms a stop against the inward movement of the inserted pigeons, which are thereby uniformly positioned in the carrier.

In using my improved trap, the same is held horizontally for the forcible insertion into the open side of the carrier of the pigeons which are of standard size and are sufficiently pinched between the upper and lower walls of the carrier to be prevented from accidentally falling out. Now when the device thus loaded with pigeons, is swung through the air, the pigeons will be discharged therefrom, being guided in their discharge by the carrier and also being set in whirling motion, the resultant of the discharging force and the frictional resistance imposed upon the pigeons by the device itself.

In the modified construction shown by Figs. 4 to 8 inclusive, the trough-like combined carrier and guide has a rigid bottom plate 15 the outer rear edge of which is upturned at a right angle to form the outside wall 16 of the device, the said wall having its edge turned upon itself to form a long tube 17 for the reception of a pintle 18 which passes through it and also through knuckles 19 formed at the ends of arms 20 offsetting from the rear edge of the top plate 21 forming the upper side of the trough of the carrier. The edge of the wall 16 is cut away to form clearance spaces 22 for the reception of the knuckles 19 aforesaid, and for the reception of helical springs 23 encircling the pintle 18 and having their respective ends engaged with the outer face of the outside wall 16 and the upper face of the top plate 21, so as to exert a constant effort to press the top plate 21 downward toward the bottom plate 15. For limiting this downward movement, I employ rigid arms 24 made integral with the outside wall 16 and clearly shown in Fig. 5. As the carrier is thus constructed, the pigeons are pinched between its upper and lower plates and prevented from falling out after insertion thereinto.

In my modified construction the handle 25 is shown as adapted to be folded into the carrier for convenience in transporting the trap. For this purpose, the said handle 25 is provided with a stem 26 bent at a right angle to form a pigeon stop or abutment 27 and terminating in a flattened locking-arm 28 having an offset end 29 receiving a pivot 30 passing through the bottom plate 15 at the inner end thereof. A heavy spring-catch 31 riveted to the lower face of the inner end of the bottom plate 15 is shaped to form a locking-recess 32 adapted to receive the flattened locking-arm 28 of the handle which is thereby rigidly held in its open position as shown in Fig. 4. The outer end of the spring-catch 31 is bent to form a lip 33 which guides the locking-arm 28 into the locking-recess 32.

When the trap is not in use, the handle 25 is folded over into the carrier as shown by broken lines in Fig. 4 of the drawings, thus making the trap convenient to carry.

The modified construction above described, operates otherwise on the same principle as the trap first explained.

I do not limit myself to the exact construction shown and described. Thus, if preferred, the upper and lower plates of the carrier might be made in one piece instead of in two pieces, as shown. Other details may be changed without departing from my invention. The length of the carrier will be varied according to the number of pigeons to be simultaneously thrown.

I claim:—

1. A hand trap for clay pigeons, having a trough-shaped, combined carrier and guide adapted in length to hold and deliver a plurality of clay pigeons.

2. A hand trap for clay pigeons, having a trough-like, combined carrier and guide with opposed plates normally exerting sufficient spring-pressure upon a clay pigeon inserted between them to keep the same from accidentally falling out.

3. A hand trap for clay pigeons, having a trough-shaped, combined carrier and guide with opposed plates both of which are narrower than half the diameter of the clay pigeons to be thrown.

4. A hand trap for clay pigeons, having a trough-shaped, combined carrier and guide with opposed top and bottom plates and an outside wall, the latter being integral with the bottom plate and the top plate having yielding connection with the said wall.

5. A hand trap for clay pigeons, having a trough-shaped, combined carrier and guide with top and bottom plates and an outside wall and open at its outer end, the said top and bottom plates being narrower than half the diameter of a standard clay pigeon, one plate yielding with respect to the other plate, and the normal width of the trough being less than the thickness of a standard clay pigeon which is frictionally held in place between the said plates until it is discharged from the open end of the trough.

6. A hand trap for clay pigeons having a trough-shaped, combined carrier and guide adapted to simultaneously receive one or more clay pigeons, and comprising a bottom plate having its outer edge turned upward at a right angle to form an outside wall, and a top plate having spring arms fastened to the said wall upon the outer face thereof.

7. A hand trap for clay pigeons, having a trough-shaped, combined carrier and guide adapted to receive one or more pigeons and provided with a handle located at an inclination to the longitudinal axis of the carrier.

8. A hand trap for clay pigeons, having a trough-shaped, combined carrier and guide adapted to receive one or more pigeons and provided with a pivotal handle normally located at an angle to the longitudinal axis of the carrier.

9. A hand trap for clay pigeons, having a trough-shaped, combined carrier and guide adapted to receive a clay pigeon and provided with a handle located at an angle to its longitudinal axis, and means for positioning the pigeon in the carrier against inward movement therein.

10. A hand trap for clay pigeons, having a trough-shaped, combined carrier and guide with top and bottom plates, a handle pivotally secured to the said bottom plate and bent to form a positioning abutment for the pigeons, and a spring co-acting with the handle for holding the same in its operative position.

11. A hand trap for clay pigeons, having a trough-shaped, combined carrier and guide with a top and a bottom plate in yielding spaced relation to each other, a handle having a positioning-abutment and a locking-arm which latter is pivoted to the said bottom plate, and locking means applied to the said bottom plate and co-acting with the said locking-arm for holding the handle in its operative position.

12. A hand trap for clay pigeons, having a trough-shaped combined carrier and guide with a top and a bottom plate in yielding spaced relation to each other, a handle pivoted to the said bottom plate, and a locking-spring fastened to the locking-plate and bent to form a locking-recess for the reception of a portion of the said handle whereby the same is locked in its operative position.

In testimony whereof, I have signed this specification in the presence of two subscribing witnesses.

GUSTAVE A. JOHNSON.

Witnesses:
DANIEL H. VEADER,
ERIK S. PALMER.

Copies of this patent may be obtained for five cents each, by addressing the "Commissioner of Patents, Washington, D. C."